United States Patent

Zahradnik et al.

[15] 3,695,535

[45] Oct. 3, 1972

[54] FILM FEEDING DEVICE

[72] Inventors: George J. Zahradnik, Wheaton; Mel E. Maurer, Glenview, both of Ill.

[73] Assignee: Elco Corporation, Jenkintown, Pa.

[22] Filed: May 27, 1970

[21] Appl. No.: 40,820

[52] U.S. Cl. ........................................242/55.19 A
[51] Int. Cl. .............................................B65h 17/48
[58] Field of Search.......242/55.19, 55.19 A; 352/78, 352/126, 128

[56] References Cited

UNITED STATES PATENTS

| | | | |
|---|---|---|---|
| 2,273,274 | 2/1942 | Krouse | 242/55.19 A |
| R22363 | 8/1943 | Miller et al. | 352/78 |
| 3,514,195 | 5/1970 | Nemeth | 352/72 |
| 3,295,782 | 1/1967 | Stark et al. | 242/55.19 A |

*Primary Examiner*—Stanley N. Gilreath
*Assistant Examiner*—Gregory A. Walters
*Attorney*—D. R. Pressman

[57] ABSTRACT

A film cartridge designed to carry on endless film which, when inserted in a movie projector, provides a film drive system for feeding the inner ends of the film's spiral roll into a film guide passageway that directs the film towards a film gate. The film drive system frictionally drives the spiral roll by using a disc member having an annular rim portion about which the spiral roll of film is disposed and having two spaced stationary support surfaces to loosely contain the spiral roll. The inner end of the spiral roll is pushed off the annular rim portion and pushed towards the film gate by driving the disc member at a constant speed such that the film is fed at a greater rate than can be accommodated by the film picker mechanism of the movie projector to provide intermittently a compensated loop of film in the film guide passageway and thereby provide a constant supply of film for the film picker mechanism as it advances the film frame by frame to the film gate.

3 Claims, 15 Drawing Figures

Inventors:—
George J. Zahradnik,
Mel E. Maurer.

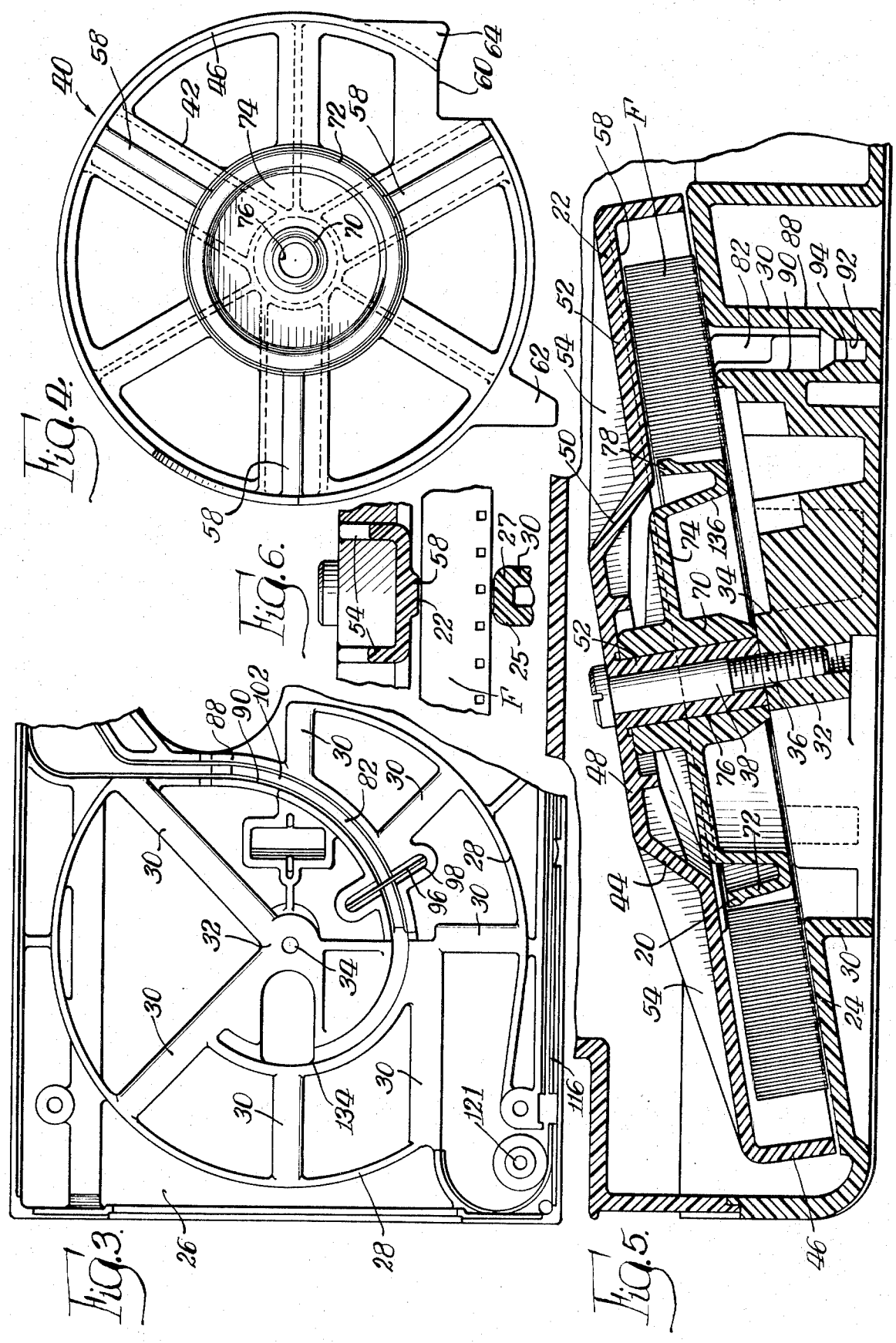

FILM FEEDING DEVICE

BACKGROUND OF THE INVENTION

This invention relates to an endless film cartridge construction of the type described in U.S. Pat. No. 3,514,195 to Nemeth, granted May 26, 1970, and assigned to the same assignee as this invention. In the Nemeth application, a novel film drive system is disclosed for feeding one end of a spiral roll of film towards the film gate. This film drive system operates on the principle of pushing the film off the spiral roll rather than the conventional arrangement of pulling the film off the spiral roll. The spiral roll of film is driven by a drive member having a flange and a central hub portion about which the spiral roll is disposed. The drive member is rotated at a constant speed to frictionally engage and drive the edges of the spiral roll such that the inner end of the spiral roll is pushed out of the plane of the spiral and through a film guide passageway towards the film gate. The speed at which the drive member is rotated is selected so that the film is fed at a faster rate than can be accommodated by the film picker mechanism of the movie projector, which has an intermittent feed rate. By overdriving the film fed to the film gate, the film in the film guide passageway intermittently buckles, forming a compensating loop which produces a back friction force greater than the forward friction force exerted on the edges of the spiral roll by the drive member, resulting in the spiral roll slipping relative to the drive member until the buckling of the film is terminated due to the advancing of the film through the film gate by the film picker mechanism.

In the above-mentioned Nemeth patent the spiral roll is contained between a stationary support surface and the rotating flange of the film drive member, which are generally in a parallel relationship and are separated a distance slightly greater than the width of the film. As the film drive member is driven, there is a slight oscillatory movement of the flange towards and away from the support surface due to the dimensional tolerances between the drive member and the shaft rotatably supporting the drive member. After a long period of use, normal wear causes this oscillatory movement to become more pronounced until finally the flange at its outer edge portion starts to intermittently move closer to the opposing support surface than the width of the film, with the result that the outer convolutions of the spiral roll are momentarily stopped. As a consequence, the feed rate to the film picker mechanism is decreased and the necessary compensating loop is no longer formed, resulting in the film being thereafter pulled from the spiral roll rather than being pushed, thus defeating the inherent advantages of the Nemeth invention. Once this jamming of the outer convolutions of the spiral roll begins, the useful life of that particular film cartridge ceases unless it is rebuilt.

By virtue of this invention, the jamming action of the outer convolutions of film by the flange portion of the drive member is eliminated regardless of the length of use of the film cartridge. Thus, the useful life of an average film cartridge which incorporates the broad principles of the Nemeth invention is greatly increased.

In one embodiment of this invention, the opposing support surfaces are formed by three spaced rollers which extend radially between the innermost and outermost convolutions of the spiral roll.

In another embodiment of this invention either one or both of the support surfaces is defined by three spaced narrow ribs which have a low coefficient of friction – and which extend radially between the innermost and outermost convolutions of the spiral roll.

DESCRIPTION OF DRAWINGS

FIG. 3 is a partial view of FIG. 2 shown with one of the wall members for containing one edge of the spiral roll and the drive disc member removed;

FIG. 4 illustrates the removed wall member and drive disc member of FIG. 3;

FIG. 5 is a cross-sectional view taken along the line 5—5 of FIG. 2 and looking in the direction of the arrows;

FIG. 6 is a cross-sectional view taken along the line 6—6 of FIG. 2 and looking in the direction of the arrows;

FIRST EMBODIMENT

Figure 1:
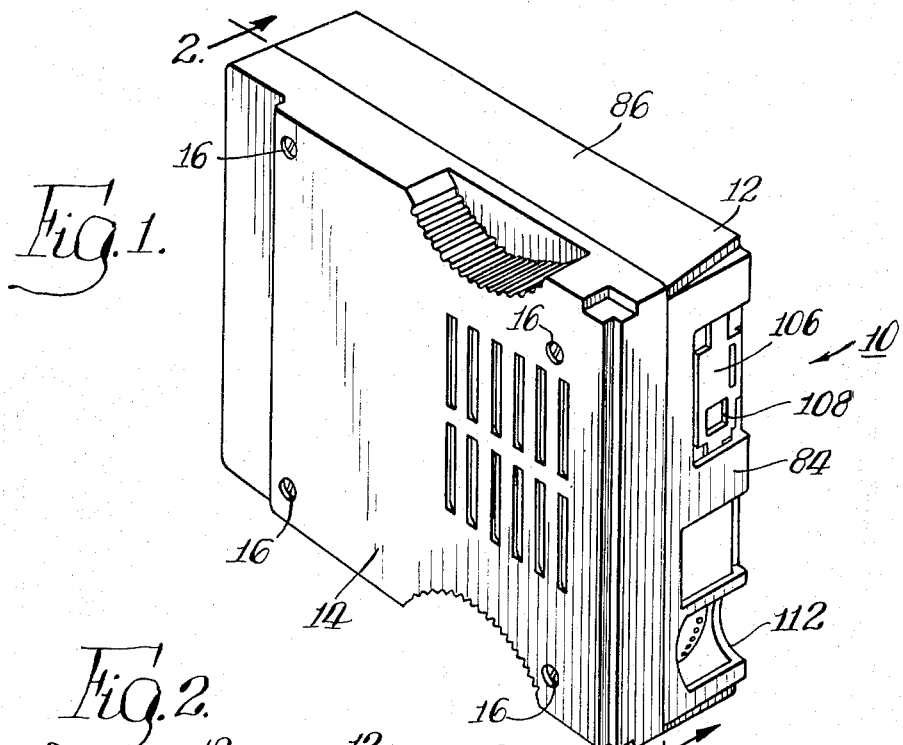
FIG. 1 is a front elevational perspective view of a film cartridge for use with endless motion projector film.

FIG. 1 shows a film cartridge 10 having a pan-shaped housing 12 and a removable cover 14, which is fastened to the pan-shaped housing 12 by means of four screws 16 screwed into threaded apertures of four projecting bosses 18 (FIG. 2) on the back wall 26 of pan-shaped housing 12. All of the operating components of the film cartridge 10 are mounted to the pan-shaped housing 12. The film cartridge 10 is adapted to carry an endless motion picture film F, and is adapted to be inserted into a cartridge receptacle of a motion picture projector.

The endless film F is arranged in the film cartridge 10 with a spiral roll portion and an exhibition portion consisting of a single strip of film extending from the innermost convolution of the spiral roll through the film gate and back to the outermost convolution of the spiral roll portion. As best seen in FIG. 5, the spiral roll portion of the motion projector film F is disposed about a disc drive member 20 and is loosely contained between two stationary wall members 22 and 24.

Inner wall member 24 is formed by means of arcuate wall segments 28 (FIG. 3) and a number of ribs 30, all of which are integrally connected to the back wall 26 of pan-shaped housing 12. The center portion 32 has a threaded opening 34 for receiving the threaded end 36 (FIG. 5) of bolt 38 about which the drive disc member 20 rotates.

The outer wall member 22 is provided by a wheel-shaped structure 40 (FIGS. 4 and 5) having a plurality of spokes 42 extending radially between an inner hub portion 44 and an outer downturned flange portion 46. The inner hub portion 44 comprises an inner circular plate 48 with an integral diverging skirt 50 extending from its outer periphery and with a hollow cylindrical stud 52 extending inwardly from its center. Each of the spokes 42 has a generally flat elongated surface 52 extending between the outer limits of the skirt 50 and the outer downturned flange 46. The spokes 42 are rigidly supported by reinforcing ribs 54 integrally formed and perpendicular to the back surface of the skirt 50 and flat elongated surface 52. Integrally formed on the inside surface of three of the spokes 42 are elongated skids 58. The skids 58 are provided to engage one edge of the spiral roll of film F, and the material used for the skids must have a low coefficient of friction.

Figure 10:
FIG. 10 is an enlarged partial view of the outer wall member shown in FIG. 5.
Figure 8:
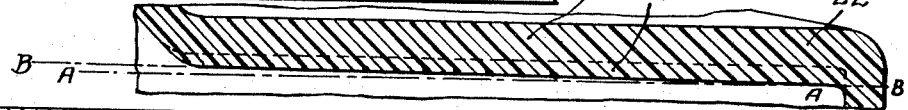
FIG. 8 is a cross-sectional view taken along the line 8—8 of FIG. 7 and looking in the direction of the arrows.
Figure 9:
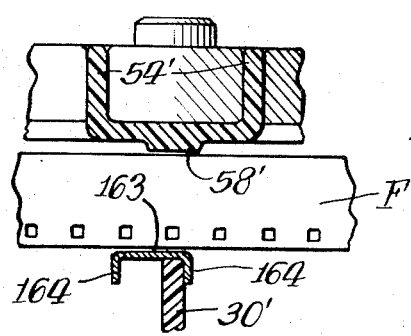
FIG. 9 is a cross-sectional view taken along the line 9—9 of FIG. 7 and looking in the direction of the arrows.

In order to permit the roll of film F to be disposed about drive disc member 20, it is necessary that the skids 58 be separated from the inner wall member 24 by a distance slightly greater than the width of the film. In the above-mentioned Nemeth application, it was disclosed that the two surfaces containing the spiral should be substantially parallel to each other. The problem in using this parallel relationship is that occasionally adjacent turns or convolutions of the spiral roll become interlocked. To alleviate this problem, it has been found that the distance separating the skids 58 and the inner wall member 24 should be gradually increased towards the drive disc member 20. This variation in the spacing is accomplished by recessing the skids 58, as shown in FIG. 10, in a radial inward direction. In other words, the skids 58 diverge in a radial inward direction toward the inner wall member 24 when the outer wall member 22 is fastened to the pan-shaped housing 12. In FIG. 10, the broken A—A represents a plane parallel to inner wall member 24 and the broken line B—B represents the plane parallel to skids 58. It can be seen that the spacing gradually increases at a uniform rate in a radial inward direction.

Figure 2:
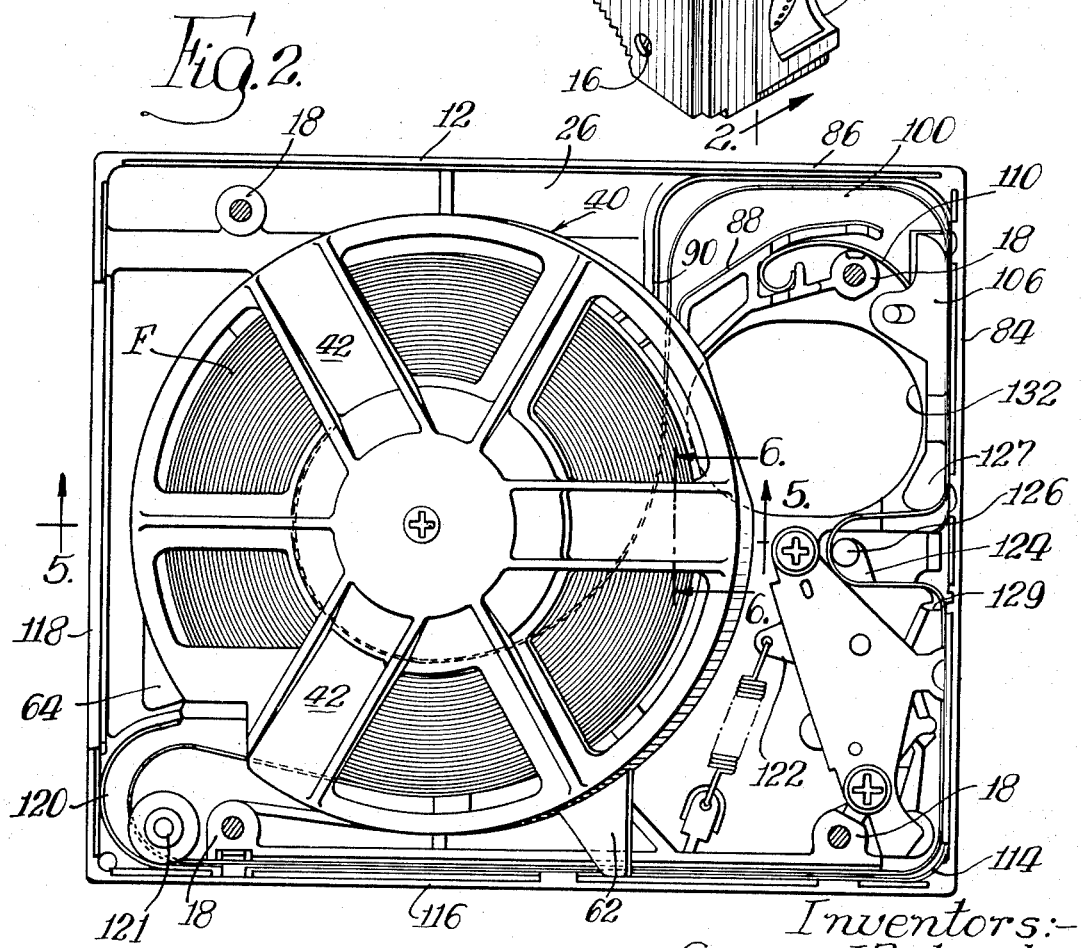
FIG. 2 is a front elevational view of the film cartridge of FIG. 1 with its outer cover removed.
Figure 7:
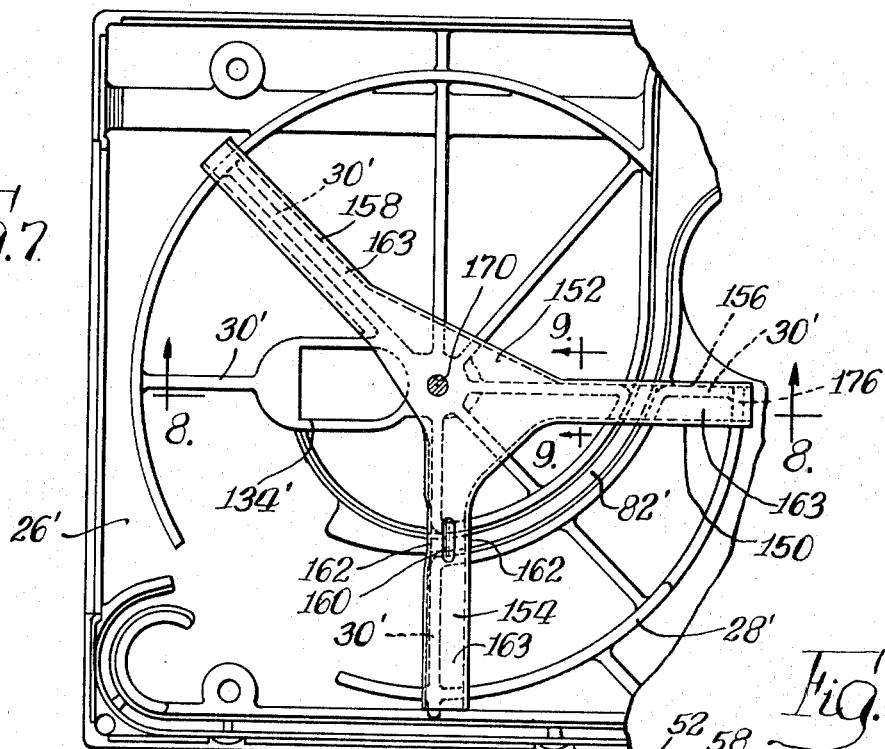
FIG. 7 is an identical view of FIG. 3 illustrating a modification of the outer wall member which contains the other edge of the spiral roll.

To provide an entrance opening for receiving the outer convolution of the spiral roll portion, as shown in FIG. 4, the wheel structure 40 has a cut-out 60 provided in its outer flange portion 46 and spoke 42. The wheel structure 40 is properly positioned in the pan-shaped housing 12 by two locating ears 62, 64 so that the cut-out 60 will be oriented in the proper position as shown in FIG. 2.

The wheel structure 40 is preferably constructed as a one piece body made of a sturdy plastic material having a low coefficient of friction. The low coefficient of friction requirement is important not only for the elongated skids 58 but also for the hollow stud portion 52 about which the drive disc member 20 is rotatably mounted.

The drive disc member 20 about which the spiral roll portion of film F is disposed comprises a central cylindrical sleeve 70 interconnected to an annular rim portion 72 by means of a circular plate 74 extending perpendicular therebetween. The cylindrical sleeve 70 is provided with a circular bore 76 for rotatably mounting the disc drive member 20 on the cylindrical stud 52 of the wheel structure 40. The annular rim portion 72 of the drive disc member 70 has a width substantially the same as the width of the film F and at its outer edge has an annular step 78 for guiding the inner convolution of the spiral roll of film F into the guide channel 82. To assist the inner convolution of the spiral roll of film F to become freed of the spiral roll, the rim portion 72 is tapered inwardly from the annular step 78.

The inner wall member 24 extends away from the back wall 26 of the pan-shaped housing 12 in a direction towards the front wall 84 of the pan-shaped housing 12 to permit the exhibition portion of the film F to be guided away from the innermost convolution of the spiral roll of film F by film guide channel 82. The film guide channel 82 comprises an elongated curved passageway which guides the inner end of the spiral roll of film F out of the plane of the spiral roll in an upward direction toward the top wall 86 of the pan-shaped housing 12. Guide channel 82 is formed by two spaced walls or ribs 88 and 90 which substantially project perpendicular from the rear wall 26 in the space between the rear wall 26 and the support surface 24. In order to avoid any rubbing of the film surface, particularly the emulsion or image portion of the film, the walls 88 and 90 of the guide channel 82 are provided, respectively, with inwardly projecting wall surfaces 92 and 94 (FIG. 5) at the bottom of channel 82. To urge the film downwardly into channel 82 adjacent its entrance, a pin 96 is mounted across the top of channel 82 in cross-slot 98.

As the guide channel 82 approaches the top wall 86 of the pan-shaped housing 12, it gradually widens and bends toward the front wall 84 to direct the exhibition portion of the film F toward the front wall 84. The horizontal portion 100 of the film guide channel 82 is substantially wider than its narrow vertical portion 102 to provide sufficient space for forming a compensating loop of film for the purposes to be described hereinafter.

At the upper end of the front wall 84, there is a pressure plate 106 (FIG. 2) for maintaining the film in a projection position. The pressure plate 106 has a projection aperture 108 is urged toward the front wall 84 by a spring member 110. The pressure plate may be of any suitable form. Various suitable forms of pressure plates and spring mountings are well known in the motion projector art.

Below the projection aperture 108, the exhibition portion of the film F passes downwardly adjacent the front wall 84 and near the bottom of the wall 84 the film F can be engaged by a film feed socket which is received through arcuate opening 112. From the drive sprocket opening 112, the exhibition portion of the film F enters a second guide channel 114 which directs the film along the bottom wall 116 of the pan-shaped housing 12. Adjacent the rear wall 118 of the pan-shaped housing 12, the second guide channel 114 terminates, and the film is bent upwardly and forwardly between curved wall 120 and guide pin 121 to feed the exhibition portion of the film F onto the outer convolution of the storage roll portion. Since it is undesirable that there be any buckling of the exhibition portion of film F in the second guide channel 114, the walls of the channel are spaced closely together to define a very narrow channel or passageway. Like the first channel 82, the walls of the second guide channel 114 are provided with inwardly extending ribs to engage the perforated edge portions of the film F.

Between the projection aperture 108 and the drive sprocket opening 112, there is a loop-forming device 122 comprising a bell crank lever 124 (partially shown) which carries a stud 126 for engaging the exhibition portion of the film F. The film which is threaded down along front wall 84 is formed into a loop between the upper and lower guide blocks 127, 129 by stud 126. When the cartridge 10 is placed in operating position in the cartridge receptacle of the motion picture projector, a stud extending from the side wall of the motion picture projector projects through an opening (not shown) in the rear wall 26 of the housing 12 and engages the bell crank lever 124 to turn the lever in a clockwise direction and move stud 126 towards front wall 84 to form a free unsupported compensating loop between the projection aperture 108 and the continuous speed sprocket opening 112. For a more complete description of this loop forming device 122, reference is made to the above Nemeth patent.

An elliptical opening 132 (FIG. 2) is provided in the back wall 26 of the housing 12 adjacent the pressure plate 106 to receive a lamp housing therein when the film cartridge 10 is inserted into the cartridge receptacle in a motion picture projector. A smaller elliptical opening 134 is also provided in the back wall 26 of the housing 12 adjacent to the center portion 32 to receive therein a flexible shaft member provided in the motion picture projector cartridge receptacle for driving the disc drive member 20. Such a flexible shaft member will drive the disc drive member 72 by turning against the inner surface 136 (FIG. 5) of the rim portion 72 of disc member 20.

For a more complete description of the cooperation between the film cartridge 10 and a motion picture projector adapted to receive a film cartridge, reference is made to the above-mentioned Nemeth Patent.

The basic principles of operation of this invention is the same as that disclosed in the above-identified Nemeth application. This invention differs from, and is an improvement over, the film drive member used by Nemeth. The Nemeth drive member consists of a one piece structure having a central hub portion and an outer flange which frictionally engage the edges on one side of the spiral roll of film to feed the inner end of the spiral roll off the central hub portion and up through the film guide passageway to the motion picture film gate. The Nemeth drive member is rotated at a constant speed such that the film is fed to the film picker drive mechanism at a greater rate than can be accommodated by the film picker drive mechanism with the result that the film in the film guide passageway buckles and forms a compensating loop.

As previously discussed, the Nemeth invention performs very satisfactorily and is recognized as a significant advance in the state of the art. However, the particular drive member used in the Nemeth device does not perform satisfactorily after a long period of use. The problem has been traced to the fact that the dimensional differences between the cylindrical sleeve of the Nemeth drive member and the shaft member about which it rotates become greater due to wear after a long period of use with the result that the Nemeth drive member acquires a greater oscillatory movement toward and away from the support surface disposed parallel to its flange, where the spiral roll is loosely contained between this support surface and the rotating flange. This oscillatory movement increases until the point is reached where the outer portion of the flange intermittently jams the outer convolutions of the spiral roll of film F against the opposite support surface. The effect of this intermittent jamming action is to slow the forward feed rate of the film from the drive member to the film gate. When the feed rate to the film picker mechanism is decreased the necessary film compensating loop is no longer formed, resulting in the film being pulled off the spiral roll by the film picker to thereby defeat the inherent advantages of the Nemeth invention. Once this jamming of the outer convolutions of the spiral roll begins, the useful life of that particular film cartridge ceases, unless it is rebuilt.

To provide a film cartridge having a longer useful life, this invention provides a different drive member than is used by Nemeth. In this invention, the spiral roll of film is driven entirely by the disc drive member 20 and the spiral roll is loosely contained between tow stationary wall members. The film supporting surface 25 for the inner wall member 24 is defined by the outer rounded corners 27 (FIG. 6) of ribs 30. The film supporting surface for the outer wall member 22 is provided by the three radially extending skids 58 on the spokes 42. As illustrated in FIG. 6, the plane of the skids and the plane of rounded corners 27 of the ribs 30 are spaced apart from each other a distance slightly larger than the width of the film F. Since these supporting surfaces for the spiral loop portion of the Film F are in a fixed stationary position, the effects of the wear between the rotating center sleeve 70 about the cylindrical stud 76 do not impair or change the driving rate of the film being fed to the film picker mechanism.

Referring to FIGS. 7 through 10, there is shown a modification of the first embodiment illustrated in FIGS. 2 through 6. The modification illustrated in FIGS. 7 through 10 comprises the addition of a star-shaped structure 150 which is mounted on the radial ribs 30'. The purpose of adding the star-shaped structure 150 is to reduce the contact area with the edge of the spiral roll of film F engaging the inside support surface 24. By reducing the points of frictional contact against this side of the spiral roll of film F, the frictional resistance to turning the spiral roll is greatly reduced and the rubbing between adjacent convolutions of the spiral roll is substantially diminished.

Although there are slight variations in the wall structure of the pan-shaped housing illustrated in FIG. 7 through 10, the arrangement of parts and their functions are identical to the pan-shaped housing 12 in FIGS. 2 through 6, and consequently, like parts are indicated by prime numbers.

The star-shaped structure 150 consists of a one piece member having a generally flat middle portion 152 and three radial arm portions 154, 156 and 158. Each of the arm portions 154, 156 and 158 has a generally flat middle portion 163 (FIG. 10) and a pair of downturned flanges 164 from either side. The downturned flange portions 164 serve to strengthen the arm portions 154, 156 and 158.

The generally flat surfaces 163 of the arm members 154, 156 and 158 thus serve as the film supporting surface upon which the inside edge of the spiral roll of film skids. In the flat portion 163 of the arm member 154, a slight depression 160 is formed adjacent the entrance of the guide channel 82' to urge the exhibition portion of the film downwardly. A recess 162 if formed in the downturned flange portions 164 on either side of depression 160 to provide a clearance for the guide channel 82'.

Star-shaped structure 150 is secured to wall member 24' by threading the lower threaded end 36' of bolt 38' through an opening 170 in middle portion 152 and tightening the bolt 38' to lock the structure 150 in place between the lower end of sleeve 70' and spacer washer 172. The arms 154, 156 and 158 are properly located on the wall member 24' and prevented from shifting about bolt 38' by hooking the outer end of arm 156 over a post 176 (FIG. 10).

SECOND EMBODIMENT

There is shown in FIGS. 11 through 14, a second embodiment of this invention. The exterior structure of the second embodiment would be identical to FIG. 1.

Like the first embodiment, the pan-shaped housing 200 of the second embodiment supports the operating components of the film cartridge and the various parts mounted along its front wall would have an identical arrangement to the first embodiment. The pan-shaped housing 200 includes a first guide channel 202 for directing the inner end of the spiral roll portion of film F out of the plane of the spiral roll and forwardly towards the film gate. Likewise, a second guide channel 204 is generally disposed along the bottom wall 206 of the housing 200 to guide the exhibition portion of the film onto the outer convolution of the spiral roll portion.

The second embodiment uses a drive disc member 210 which is identical in construction and operation to the drive disc member 20 of the first embodiment. The essential difference between the first and second embodiments is the structure used to contain the convolutions of the spiral roll portion about the annular rim 212 of disc drive member 210. The spiral roll portion is loosely contained between the inner set of rollers 214 and an outer set of rollers 216, both of which extend radially between the intermost and outermost convolutions. The planes of the inner and outer set of rollers 214, 216 are spaced apart a distance slightly greater than the width of the film F.

As was previously explained with regard to the first embodiment and illustrated in FIG. 10, the distance separating rollers 214 and 216 should gradually increase towards the drive disc member 210 in order to prevent adjacent turns of the spiral roll from becoming interlocked as they move inwardly. This variation in distance is so slight that it is only perceptible in an enlarged view (such as FIG. 10).

Figure 13:
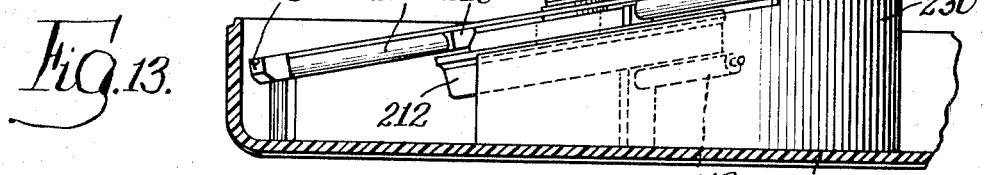
FIG. 13 is a sectional view taken along the line 13—13 of FIG. 12 and looking in the direction of the arrows.
Figure 14:
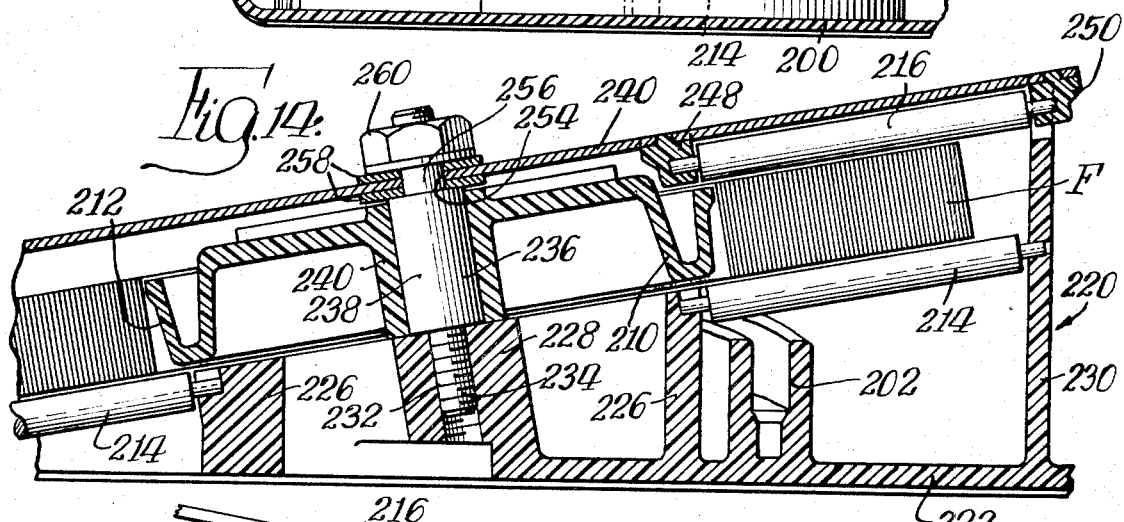
FIG. 14 is a sectional view taken along the line 14—14 of FIG. 12.
Figure 15:
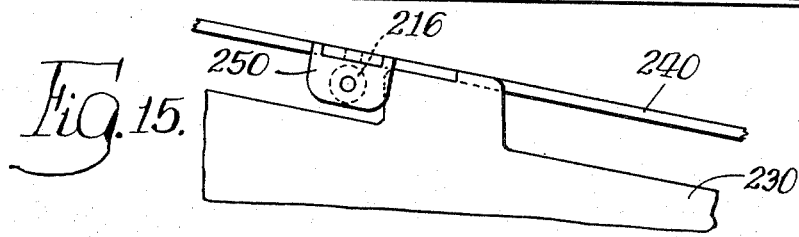
FIG. 15 is a sectional view taken along the lime 15—15 of FIG. 12 and looking in the direction of the arrows.

The inner set of rollers 214 is rotatably mounted on inner wall member 220, which includes a plurality of radially extending ribs 224, an inner circular ring 226, a center mounting boss 228 and outer circular segments 230. The outer edge of the inner wall member 220 extends in a transverse angle away from the back wall 222, as illustrated in FIG. 13, to permit the inner end of the spiral roll to move out of the plane of the spiral roll and into the guide channel 202 which is disposed under the spiral roll portion. The inner rollers 214 are rotatably mounted between the inner ring 226 and the outer circular segments 230 in an equal-space, radially-extending relationship with respect to the center boss 228. The center boss 228 has a threaded aperture 232 extending inwardly from its upper end for receiving the lower threaded end 234 of a shaft member 236. The enlarged cylindrical portion 238 of the shaft member 236 provides the rotational axis about which the hollow sleeve 240 of drive disc member 210 rotates.

The outer set of rollers 216 are mounted on a roller guide plate 240 having a plurality of radial spokes 242 which extend between a center portion 244 and an outer ring portion 246. The rollers 216 are rotatably mounted between inner and outer guide blocks 248 and 250 which are secured, respectively, to the lower surfaces of inner and outer ring portions 252, 246 of the circular plate 240. As is illustrated in FIG. 11, the rollers 216 thus extend radially in an equal space relationship about the inner portion 244 of circular plate 240.

A mounting aperture 254 is provided in the middle of center portion 244 for mounting the circular plate 240 on the reduced portion 256 of shaft member 236 between a pair of washers 258, and is secured in place by a nut 260 screwed on the upper threaded end of shaft member 236.

Figure 11:
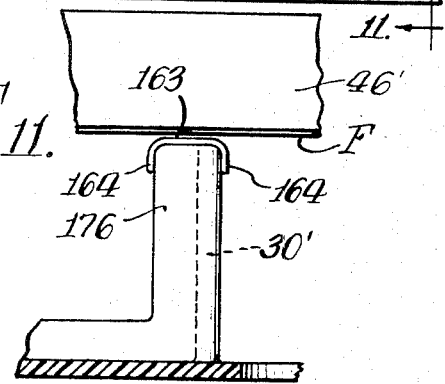
FIG. 11 is a cross-sectional view taken along the line 11—11 of FIG. 8 and looking in the direction of the arrows.
Figure 12:
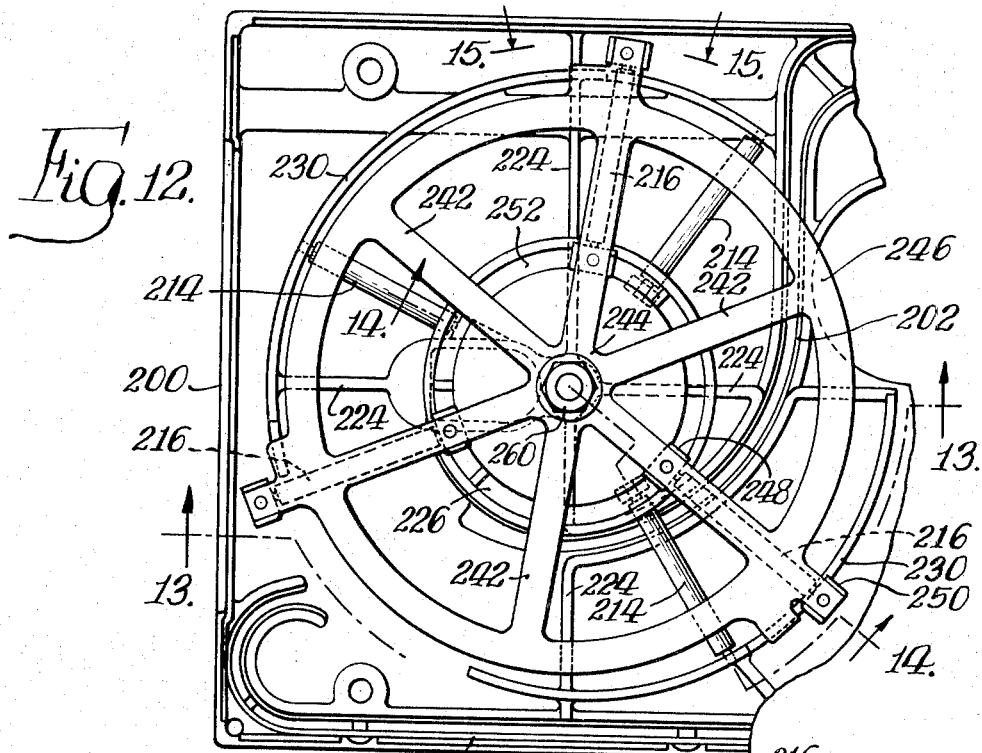
FIG. 12 is a partial view similar to FIG. 2 illustrating a second embodiment of this invention.

From FIG. 11, it can be seen that the inner and outer set of rollers 214 and 216 are not in alignment. They must, however, be disposed in a plane which is separated from the plane of the other set of rollers by a distance slightly greater than the width of the film.

From the foregoing description, it is apparent that the two sets of rollers 214 and 216 provide a substantially frictionless guiding surface to contain the convolutions of the spiral roll portion of film F as the drive disc member 210 rotates to feed the inner end of the spiral roll into the entrance of guide channel 202. By virtue of having these two sets of rollers, the frictional contact between the adjacent loops in the spiral roll portion is greatly reduced since there is no retardation of the rotation of the loops between their two edges and the rollers 214 and 216.

Although the above description contains many specificities, these are not intended to limit the scope of the invention, but merely to exemplify one preferred embodiment thereof. The true scope of the invention is intended to be indicated by the subject matter of the appended claims and their legal equivalents.

We claim:

1. In a film cartridge for an endless film having a roll portion in the form of a spiral roll composed of a substantial number of convolutions and an exhibition portion extending forwardly from said roll in a single loop from the innermost convolution through a film gate to the outermost convolution thereof, in combination: a disc drive member having an annular rim portion about which spiral roll is disposed, said disc drive member being rotatably supported between two wall members, said wall members having support surfaces extending radially between said innermost and outermost convolutions of said spiral roll and spaced apart by a distance slightly greater than the width of the film to loosely confine said spiral roll therebetween wherein one of said wall members comprising a circular wheel structure with a central hub portion and a plurality of spokes extending radially therefrom, a narrow rib member having a small coefficient of friction formed along at least three of said spokes towards the other of said wall members to define one of said support surfaces for said spiral roll where the center of said central hub is mounted along the axis of said disc drive member, guide means extending from a point adjacent to said disc drive member out of the plane of said spiral roll to guide the inner convolution of film from said spiral roll to said film gate, return guide means for receiving the exhibition portion of film passed through said film gate to guide the film onto the outer convolution of said spiral roll, and means for rotating said disc drive member at a speed slightly greater than that necessary to feed the film through said film gate.

2. The combination of claim 1, wherein said other support surface is formed by a star-shaped structure having a low coefficient of friction mounted on said other wall member, said star-shaped structure comprising a center portion mounted along the rotational axis of said disc drive member and at least three arm portions extending outwardly from said center portion.

3. The combination of claim 1, wherein the distance separating said wall members gradually increases in a radial inward direction between the outermost and innermost convolutions of the spiral roll of film.

* * * * *